US012793552B2

(12) United States Patent
Kashiwakura et al.

(10) Patent No.: US 12,793,552 B2
(45) Date of Patent: Nov. 10, 2026

(54) INFORMATION PROCESSING APPARATUS AND OPERATING METHOD OF SYSTEM

(71) Applicant: TOYOTA JIDOSHA KABUSHIKI KAISHA, Toyota (JP)

(72) Inventors: Toshiki Kashiwakura, Tokyo-to (JP); Chihiro Inaba, Tokyo-to (JP); Shoi Suzuki, Tokyo-to (JP); Tsuyoshi Okada, Nagoya (JP); Yasuhiro Kobatake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 18/985,546

(22) Filed: Dec. 18, 2024

(65) Prior Publication Data

US 2025/0218298 A1 Jul. 3, 2025

(30) Foreign Application Priority Data

Dec. 28, 2023 (JP) ................................ 2023-223215

(51) Int. Cl.
*G08G 1/16* (2006.01)

(52) U.S. Cl.
CPC ............ *G08G 1/166* (2013.01); *G08G 1/164* (2013.01)

(58) Field of Classification Search
None
See application file for complete search history.

(56) References Cited

U.S. PATENT DOCUMENTS

2020/0273325 A1* 8/2020 Ueno ...................... G06F 16/00
2020/0275243 A1* 8/2020 Ueno ...................... G08G 1/005
2021/0067905 A1* 3/2021 Feldbeine .......... G01C 21/3691

FOREIGN PATENT DOCUMENTS

JP 2021144539 A 9/2021
JP 2023050629 A 4/2023

* cited by examiner

*Primary Examiner* — Peter D Nolan
*Assistant Examiner* — Matthew Cobb
(74) *Attorney, Agent, or Firm* — KENJA IP LAW PC

(57) ABSTRACT

An information processing apparatus includes a memory configured to store information on a position of a roadside apparatus that presents assistance information to assist with walking to a pedestrian, a communication interface, and a controller configured to communicate using the communication interface, and transmit to a mobile terminal, when the mobile terminal is located at a first distance from the roadside apparatus, first instruction information to cause the mobile terminal to execute a notification operation for alerting a pedestrian carrying the mobile terminal.

3 Claims, 4 Drawing Sheets

INFORMATION PROCESSING APPARATUS AND OPERATING METHOD OF SYSTEM

CROSS-REFERENCE TO RELATED APPLICATION

This application claims priority to Japanese Patent Application No. 2023-223215, filed on Dec. 28, 2023, the entire contents of which are incorporated herein by reference.

TECHNICAL FIELD

The present disclosure relates to an information processing apparatus and an operating method of a system.

BACKGROUND

Roadside apparatuses such as traffic signals that alert pedestrians with voice or the like to assist with safe walking of the pedestrians, who are walking on the road, are known. Patent Literature (PTL) 1 discloses a notification system that notifies other vehicles, pedestrians and the like of traffic availability, alerts and the like according to the behavior of an automated vehicle that is scheduled to pass through a predetermined traffic area.

CITATION LIST

Patent Literature

PTL 1: JP 2023-050629 A

SUMMARY

If pedestrians are, for example, unaware that the information was notified to them, or even unaware of the existence of the roadside apparatuses, there is a risk that information to assist with walking may not be reliably communicated to the pedestrians. Therefore, there is room to improve the reliability of communicating to pedestrians information to assist with walking.

The present disclosure relates to an information processing apparatus or the like that enables to improve the reliability of communicating to pedestrians information to assist with walking.

An information processing apparatus in the present disclosure includes:

- a memory configured to store information on a position of a roadside apparatus that presents assistance information to assist with walking to a pedestrian;
- a communication interface; and
- a controller configured to:
  - communicate using the communication interface; and
  - transmit to a mobile terminal, when the mobile terminal is located at a first distance from the roadside apparatus, first instruction information to cause the mobile terminal to execute a notification operation for alerting a pedestrian carrying the mobile terminal.

An operating method of a system in the present disclosure is an operating method of a system, the system including an information processing apparatus having information on a position of a roadside apparatus that presents assistance information to assist with walking to a pedestrian, and a mobile terminal, the operating method including:

- transmitting, by the information processing apparatus, when the mobile terminal is located at a first distance from the roadside apparatus, first instruction information to cause the mobile terminal to execute a notification operation for alerting a pedestrian carrying the mobile terminal; and
- executing, by the mobile terminal, the notification operation based on the first instruction information.

According to the information processing apparatus or the like in the present disclosure, it is possible to improve the reliability of communicating to pedestrians information to assist with walking.

DETAILED DESCRIPTION

An embodiment will be described below with reference to the drawings.

Figure 1:
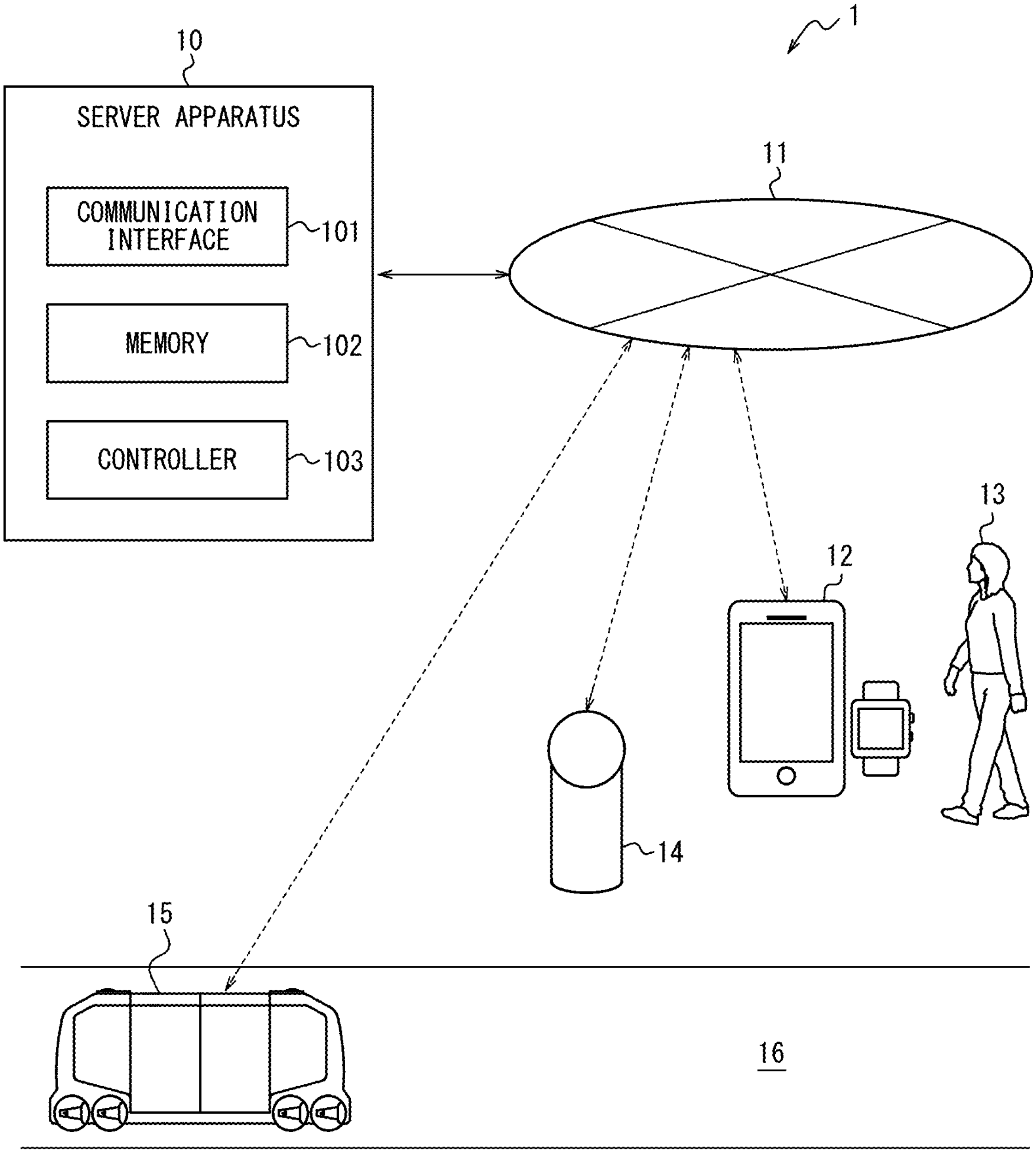
FIG. 1 is a diagram illustrating an example configuration of an information processing system.

FIG. 1 is a diagram illustrating a configuration example of an information processing system according to an embodiment. An information processing system 1 includes one or more each of a server apparatus 10, a mobile terminal 12, a roadside apparatus 14, and a vehicle 15 communicably connected to each other via a network 11.

The server apparatus 10 is, for example, a server computer that belongs to a cloud computing system or other computing system and functions as a server that implements various functions. The server apparatus 10 may be configured by two or more server computers that are communicably connected to each other and operate in cooperation. The server apparatus 10 corresponds to an "information processing apparatus" in the present embodiment.

The network 11 may, for example, be the Internet or may include a mobile communication network, an ad hoc network, a local area network (LAN), a metropolitan area network (MAN), other networks, or any combination thereof.

The mobile terminal 12 is a terminal apparatus carried by a pedestrian, having information communication functions connected to the network 11 by mobile communications and configured to perform various information processing and output of information. The mobile terminal 12 is configured with one or more GNSS receivers and is capable of detecting the current position. The mobile terminal 12 is, for example, a smart phone, smart watch, wearable terminal, etc.

The roadside apparatus 14 is an apparatus installed along the sidewalk, such as at the edge of the sidewalk closer to the roadway 16, and is equipped with a camera that takes pictures of the sidewalk, a processor that processes information, a display that outputs information, speakers, and other devices. The roadside apparatus 14 may have a communication function that enables information communication with the server apparatus 10 via the network 11. Upon capturing an image that includes a pedestrian 13 passing on the sidewalk, the roadside apparatus 14 outputs various information to assist with walking to the pedestrian 13 by display or voice. The roadside apparatus 14 can be operated, for example, by the internal battery without receiving an external power supply.

The vehicle 15 is a passenger car or a commercial vehicle provided with communication functions and information processing functions and connects to the network 11 by mobile communications. The vehicle 15 is also configured with one or more GNSS receivers to detect the current position. The vehicle 15 may be driven by a driver, or driving may be automated at any level, such as one of Level 1 to Level 5 defined by the Society of Automotive Engineers (SAE). The vehicle 15 may also be a battery electric vehicle (BEV) or a hybrid electric vehicle (HEV) that uses battery power for at least part of the energy for driving.

In the information processing system 1, the server apparatus 10 includes a communication interface 101, a memory 102, and a controller 103. The memory 102 stores information on a position of the roadside apparatus 14 that presents assistance information to assist with walking to the pedestrian 13. The controller 103 communicates with the mobile terminal 12 and the like using the communication interface 101. The controller 103 transmits to the mobile terminal 12, when the mobile terminal 12 is located at a predetermined distance from the roadside apparatus 14, instruction information to cause the mobile terminal 12 to execute a notification operation for alerting the pedestrian 13 carrying the mobile terminal 12. According to the operation of such server apparatus 10, when the pedestrian 13 approaches a predetermined distance from the roadside apparatus 14, the mobile terminal executes a notification operation. Notification operations are operations for alerting the pedestrian 13 to the roadside apparatus 14 or the information presented by the roadside apparatus 14, and include, for example, sounding a notification tone, generating vibrations, displaying a notification message, etc. The notification operation increases the probability that the pedestrian 13 will pay attention to the roadside apparatus 14 or the assistance information presented by the roadside apparatus 14. Upon detecting the approach of the pedestrian 13 through the captured image, the roadside apparatus 14 outputs assistance information to assist with walking, for example, information to inform the pedestrian 13 of the existence and position of a pedestrian crossing, the approach of the vehicle 15, etc., through display or voice. In this way, it is possible to improve the reliability of communicating to the pedestrian 13 information to assist with walking by the roadside apparatus 14.

Configurations of the server apparatus 10 will be described in detail. The server apparatus 10 includes the communication interface 101, the memory 102, and the controller 103. These configurations are appropriately arranged on two or more computers in a case in which the server apparatus 10 is configured by two or more server computers.

The communication interface 101 includes one or more interfaces for communication. The interface for communication is, for example, a LAN interface. The communication interface 101 receives information to be used for operations of the server apparatus 10 and transmits information obtained by the operations of the server apparatus 10. The server apparatus 10 is connected to the network 11 by the communication interface 101 and communicates information with the mobile terminal 12 and the like via the network 11.

The memory 102 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 102 stores information to be used for the operations of the server apparatus 10 and information obtained by the operations of the server apparatus 10.

The controller 103 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 103 executes information processing related to the operations of the server apparatus 10 while controlling the components of the server apparatus 10.

The functions of the server apparatus 10 are realized by a processor included in the controller 103 executing a control program. The control program is a program for causing a computer to function as the server apparatus 10. Some or all of the functions of the server apparatus 10 may be realized by a dedicated circuit included in the controller 103. The control program may be stored on a non-transitory recording/storage medium readable by the server apparatus 10 and be read from the medium by the server apparatus 10.

Figure 2:
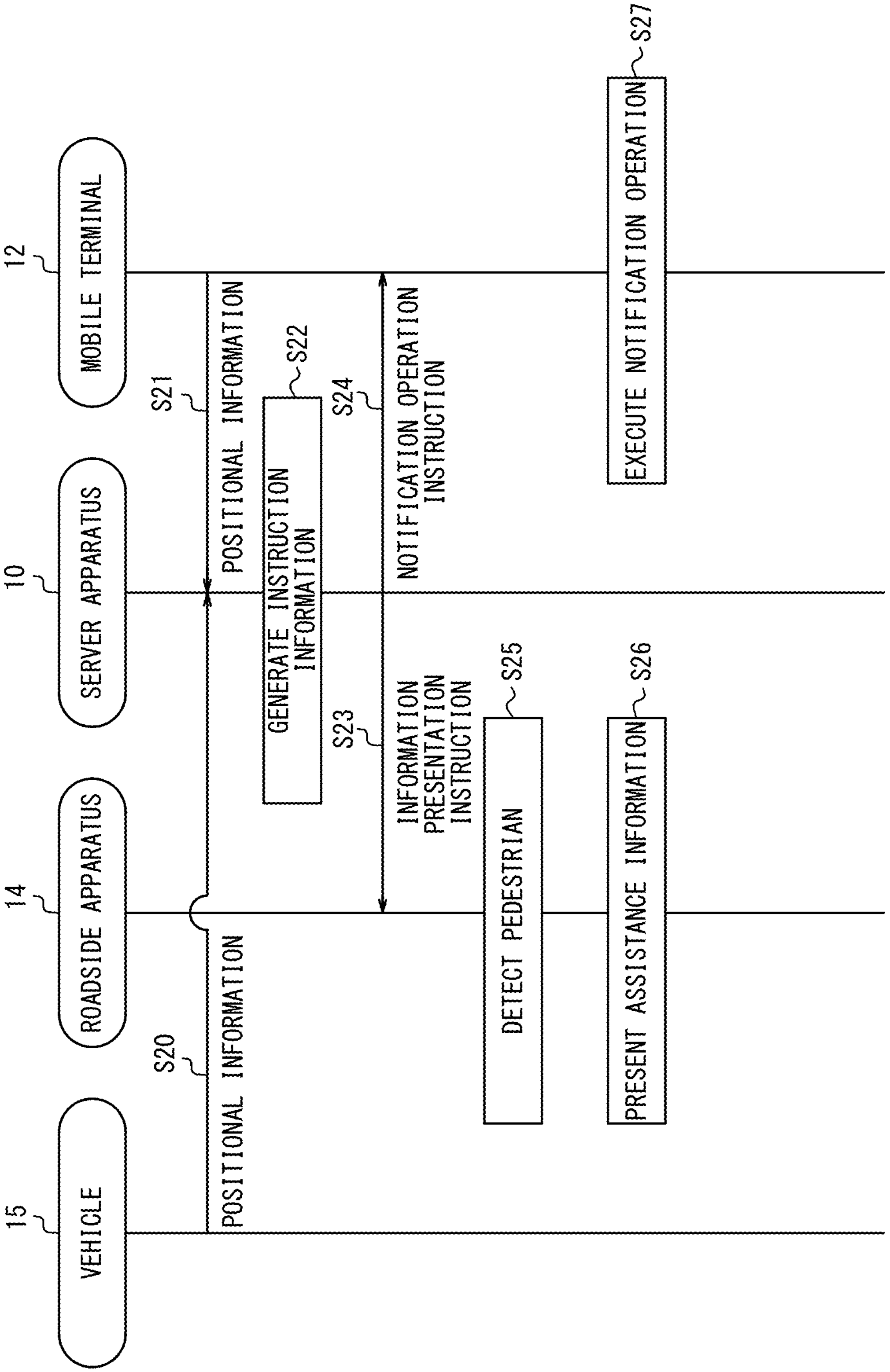
FIG. 2 is a diagram illustrating an example operation procedure of the information processing system.

FIG. 2 is a sequence diagram to illustrate the operating procedures of the information processing system 1 in the present embodiment. FIG. 2 illustrates the steps in the coordinated operation of the server apparatus 10, the mobile terminal 12, the roadside apparatus 14, and the vehicle 15.

In steps S20 and S21, the server apparatus 10 acquires respective positional information from the vehicle 15 and the mobile terminal 12, respectively. The vehicle 15 and the mobile terminal 12 each transmit information on their current position detected using GNSS receivers to server apparatus 10, respectively. Steps S20 and S21 are executed in arbitrary cycles, e.g., a few seconds, respectively.

In step S22, the server apparatus 10 generates instruction information using the positional information for the mobile terminal 12 and the vehicle 15. The instruction information includes information presentation instructions to cause the roadside apparatus 14 to output information to assist with walking to the pedestrian 13 (hereinafter referred to as "assistance information") and notification operation instructions to cause the mobile terminal 12 to execute notification operations. The detailed example procedure of step S2 is illustrated in FIG. 3.

Figure 3:
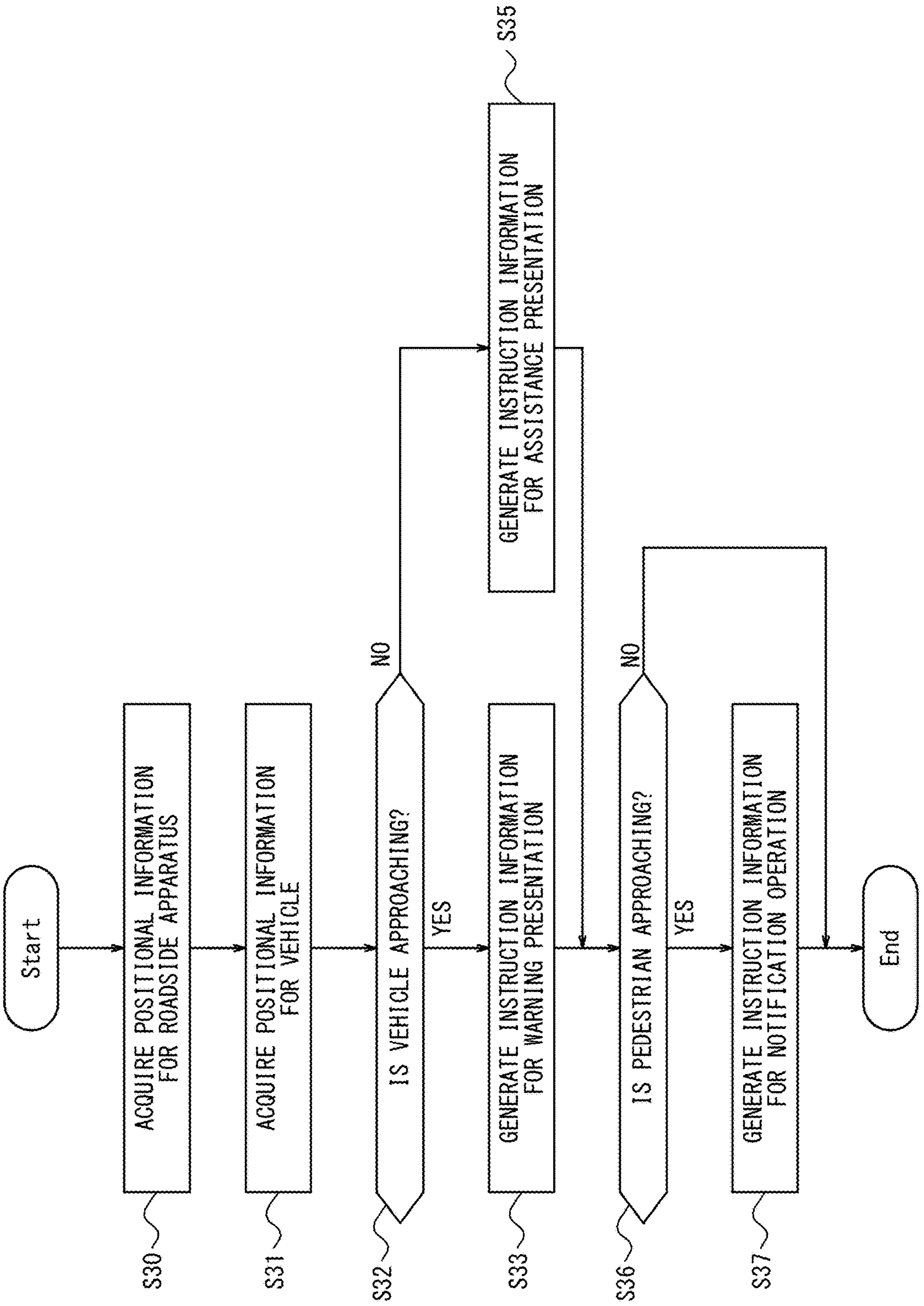
FIG. 3 is a diagram illustrating an example operation procedure of an information processing apparatus.

FIG. 3 illustrates an example procedure for generating instruction information by the server apparatus 10. Each step in FIG. 3 is executed by the controller 103 of the server apparatus 10.

In step S30, the controller 103 acquires positional information for the roadside apparatus 14. The memory 102 is pre-stored with positional information for each of one or more of the roadside apparatuses 14 in any given city block. The controller 103 reads and acquires the positional information for each roadside apparatus 14 from the memory 102.

In step S31, the controller 103 acquires positional information for the vehicle 15. The memory 102 stores the history of positional information transmitted periodically from vehicles 15 operating in any given city block. The controller

103 reads and acquires the most recent positional information for each of the vehicles 15 from the memory 102.

In step S32, the controller 103 determines for each roadside apparatus 14 whether the vehicle 15 is approaching the roadside apparatus 14. Since the roadside apparatus 14 is installed on the roadside of a roadway 16, the controller 103 determines whether one or more vehicles 15 are located within any standard distance range from the roadside apparatus 14 on the roadway 16 that the roadside apparatus 14 faces. The reference distance is, for example, the distance at which it is desirable to notify the pedestrian of the approach of the vehicle 15, assuming that the pedestrian is attempting to cross the roadway 16, etc. at the position where the roadside apparatus 14 is installed, for example, 30 m to 100 m. The controller 103 uses the positional information for the roadside apparatus 14 and the vehicle 15 to derive the distance to the nearest vehicle 15 for each roadside apparatus 14 and determines that the vehicle 15 is approaching the roadside apparatus 14 if the distance is less than the reference distance, otherwise the vehicle 15 is not approaching the roadside apparatus 14. If the vehicle 15 is approaching the roadside apparatus 14 (Yes), the controller 103 proceeds to step S33; if the vehicle 15 is not approaching the roadside apparatus 14 (No), it proceeds to step S35.

In step S33, the controller 103 generates instruction information for warning presentation for each of the roadside apparatuses 14 that the vehicle 15 is determined to be approaching. The instruction information for warning presentation is information for instructing the roadside apparatus 14 to present assistance information for warning. The assistance information for warning is, for example, text or voice information such as "A car is approaching, please be careful".

On the other hand, in step S35, the controller 103 generates instruction information for normal assistance presentation for each of the roadside apparatuses 14 that it determines that the vehicle 15 is not approaching. The instruction information for normal assistance information presentation is information for instructing the roadside apparatus 14 to present normal assistance information. Normal assistance information is, for example, textual or voice information such as "There is a pedestrian crossing in 5 meters".

In step S36, the controller 103 determines for each roadside apparatus 14 whether the pedestrian 13 is approaching the roadside apparatus 14. Since the roadside apparatus 14 is installed on the roadside of the roadway, the controller 103 determines whether one or more pedestrians 13 are located within an arbitrary reference distance range from the roadside apparatus 14 on the sidewalk where the roadside apparatus 14 is installed. The reference distance is, for example, the distance at which it is desirable to alert the pedestrian 13 to the assistance information output by the roadside apparatus 14, e.g., 3 m to 10 m. The controller 103 uses the positional information for the roadside apparatus 14 and the mobile terminal 12 carried by the pedestrian 13 to derive the distance to the nearest mobile terminal 12 for each roadside apparatus 14, and if the distance is smaller than the reference distance, determines that the pedestrian 13 is approaching the roadside apparatus 14, otherwise determines that the pedestrian 13 is not approaching the roadside apparatus 14. If the pedestrian 13 is approaching the roadside apparatus 14 (Yes), the controller 103 proceeds to step S37; if the pedestrian 13 is not approaching the roadside apparatus 14 (No), it skips step S37 and terminates the FIG. 3 procedure.

In step S37, the controller 103 generates instruction information for notification operation for each of the roadside apparatuses 14 that the pedestrian 13 is determined to be approaching. The instruction information for notification operation is information for instructing the roadside apparatus 14 to execute the notification operation.

The controller 103 then terminates the procedures of FIG. 3.

Returning to FIG. 2, in step S23, the server apparatus 10 transmits the instruction information generated in step S22 that directs the presentation of information for warning or normal assistance to the roadside apparatus 14. The controller 103 transmits the instruction information via the communication interface 101 to each of the roadside apparatuses 14 to which the instruction information corresponds. When each roadside apparatus 14 receives instruction information by the communication module, it stores the instruction information in its built-in memory device.

In step S25, the roadside apparatus 14 detects the pedestrian 13. The processor of the roadside apparatus 14 detects pedestrians 13 by performing any image processing, such as pattern recognition, on the captured image of the sidewalk to detect images that indicate a person.

Conditional on the detection of the pedestrian 13, in step S26, the roadside apparatus 14 presents the assistance information to the pedestrian 13. The processor of the roadside apparatus 14 outputs warning or normal assistance information for assistance according to the instruction information received from the server apparatus 10. For example, in the case of assistance information for warnings, the roadside apparatus 14 displays text information such as "A car is approaching, please be careful" or outputs it by voice. Alternatively, in the case of normal assistance information for assistance, the roadside apparatus 14 outputs an audible voice, such as "There is a pedestrian crossing in 5 meters". If no pedestrian 13 is detected, step S26 is omitted.

Meanwhile, in step S24, the server apparatus 10 transmits the instruction information to the mobile terminal 12 to instruct the notification operation generated in step S22. The controller 103 transmits the instruction information via the communication interface 101 to each of the mobile terminals 12 to which the instruction information corresponds. When each of the mobile terminals 12 receives instruction information by the communication module, it stores the instruction information in its built-in storage device.

In step S27, the mobile terminal 12 executes a notification operation. The processor of the mobile terminal 12 executes any notification operation according to the instruction information received from the server apparatus 10. For example, the processor executes notification operations by outputting notification sounds through a speaker, generating vibrations through an actuator, flickering a display, or displaying a message. With such notification operation, the mobile terminal 12 can alert the pedestrian 13 to the assistance information output by the roadside apparatus 14.

According to the procedure described above, it is possible to improve the reliability of communicating to the pedestrian 13 information to assist with walking by the roadside apparatus 14.

Figure 4:
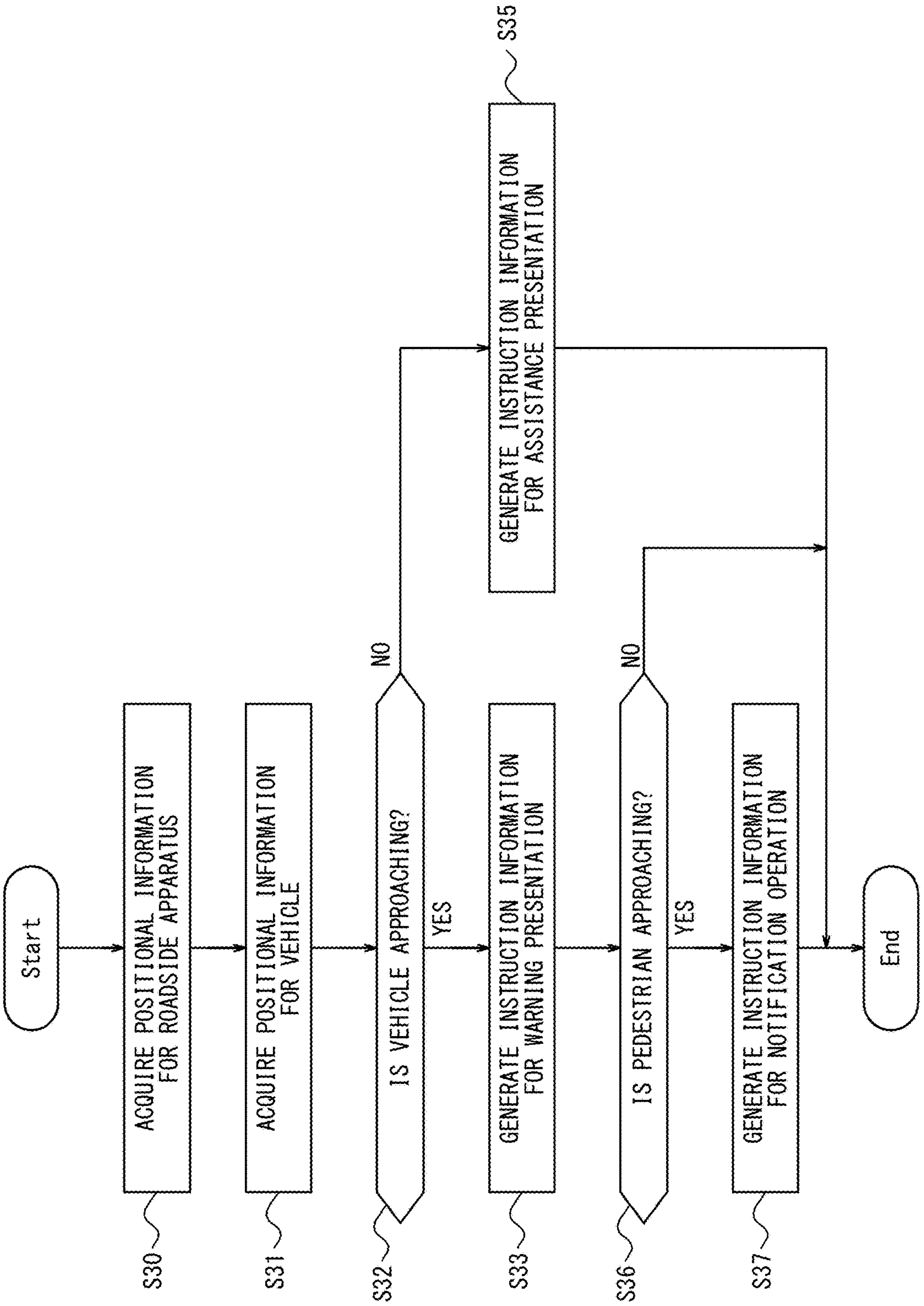
FIG. 4 is a diagram illustrating a variation of the operation procedure of the information processing apparatus.

FIG. 4 illustrates the procedures for a variation of FIG. 3. The procedure of FIG. 4 differs from the procedure of FIG. 3 in that if the vehicle 15 is not approaching the roadside apparatus 14 in step S32 (No), the procedure of FIG. 3 is terminated instead of proceeding to step S36. According to the procedure of FIG. 4, if the vehicle 15 is not approaching the roadside apparatus 14, no instruction information for executing the notification operation to the mobile terminal 12 is generated. Therefore, the transmission of the instruction information from the server apparatus 10 in step S24 of FIG. 2 is omitted. Avoids needlessly bothering the pedestrians 13 when there are no vehicles 15 approaching.

In the embodiment described above, the server apparatus 10 causes the roadside apparatus 14 to present contents of assistance information, which differ depending on the distance between the roadside apparatus 14 and the vehicle 15. However, even if the roadside apparatus 14 presents assistance information when it detects the pedestrian 13 without receiving instructions from the server apparatus 10, the present embodiment is still applicable. When the pedestrian 13 approaches the roadside apparatus 14 carrying the mobile terminal 12, the mobile terminal 12 executes a notification operation to stimulate and alert the pedestrian 13 to the assistance information output by the roadside apparatus 14.

In a further variation, the positional information for each roadside apparatus 14 may be transmitted from the server apparatus 10 to the mobile terminal 12 as instruction information. In such a case, each mobile terminal 12 may determine its proximity to the roadside apparatus 14 based on its own positional information and the positional information for the roadside apparatus 14 and execute the notification operation.

In the embodiment described above, the processing and control program that causes the mobile terminal 12 to execute the indicated operation can be stored in the memory of the server apparatus 10 or another server apparatus and downloaded to the mobile terminal 12 via the network 11.

While the embodiment has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. An information processing apparatus comprising:

a memory configured to store information on a position of a roadside apparatus that presents assistance information to assist with walking to a pedestrian carrying a mobile terminal;

a communication interface; and a controller configured to:

acquire information on a position of a vehicle;

acquire information on a position of the mobile terminal;

upon determining based on the information on the position of the roadside apparatus and the information on the position of the vehicle that the vehicle is located within a second predetermined distance from the roadside apparatus, transmit, via the communication interface to the roadside apparatus, first instruction information to cause the roadside apparatus to present warning assistance information indicating that the vehicle is approaching;

upon determining based on the information on the position of the roadside apparatus and the information on the position of the vehicle that the vehicle is not located within the second predetermined distance from the roadside apparatus, transmit, via the communication interface to the roadside apparatus, second instruction information to cause the roadside apparatus to present normal assistance information different from the warning assistance information; and upon determining based on the information on the position of the roadside apparatus and the information on the position of the mobile terminal that the mobile terminal is located within a first predetermined distance from the roadside apparatus, transmit, via the communication interface to the mobile terminal, third instruction information to cause the mobile terminal to execute a notification operation for alerting the pedestrian to the roadside apparatus or the assistance information presented by the roadside apparatus.

2. An operating method of a system, the system comprising an information processing apparatus having information on a position of a roadside apparatus that presents assistance information to assist with walking to a pedestrian, and a mobile terminal carried by the pedestrian, the operating method comprising:

acquiring, by the information processing apparatus, information on a position of a vehicle;

acquiring, by the information processing apparatus, information on a position of the mobile terminal;

upon determining based on the information on the position of the roadside apparatus and the information on the position of the vehicle that the vehicle is located within a second predetermined distance from the roadside apparatus, transmitting, by the information processing apparatus to the roadside apparatus, first instruction information to cause the roadside apparatus to present warning assistance information indicating that the vehicle is approaching;

upon determining based on the information on the position of the roadside apparatus and the information on the position of the vehicle that the vehicle is not located within the second predetermined distance from the roadside apparatus, transmitting, by the information processing apparatus to the roadside apparatus, second instruction information to cause the roadside apparatus to present normal assistance information different from the warning assistance information;

upon determining based on the information on the position of the roadside apparatus and the information on the position of the mobile terminal that the mobile terminal is located within a first predetermined distance from the roadside apparatus, transmitting, by the information processing apparatus, to the mobile terminal, third instruction information to cause the mobile terminal to execute a notification operation for alerting the pedestrian to the roadside apparatus or the assistance information presented by the roadside apparatus; and executing, by the mobile terminal, the notification operation based on the third instruction information.

3. The information processing apparatus according to claim 1, wherein the controller is configured not to transmit the third instruction information upon determining that the vehicle is not located within the second predetermined distance from the roadside apparatus.

* * * * *